April 18, 1944.   H. R. C. ANTHONY   2,346,640
METHOD OF MAKING A LEAKPROOF DRY CELL
Filed July 11, 1942
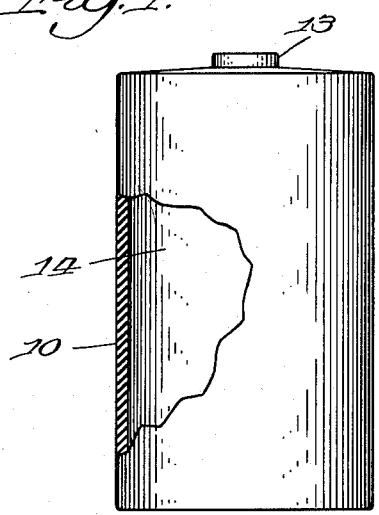
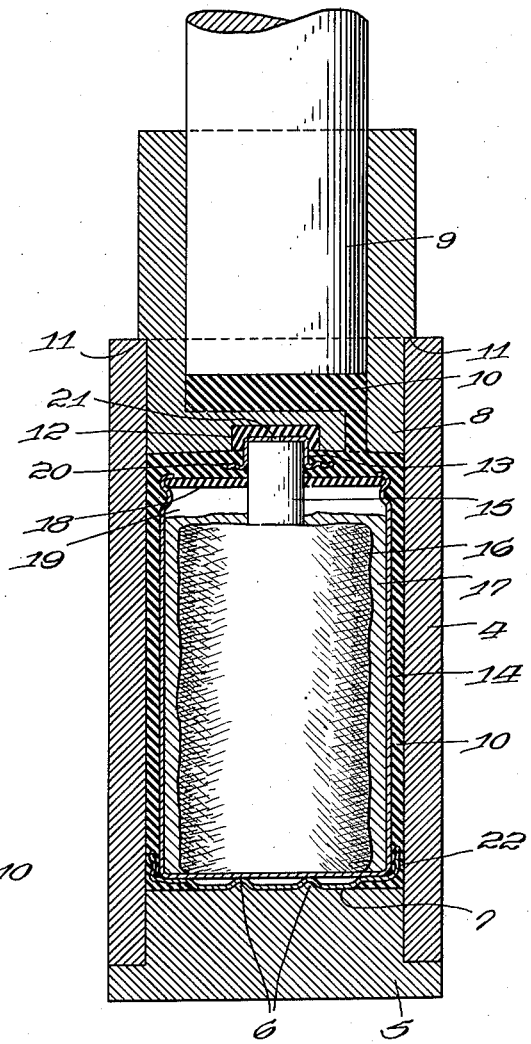
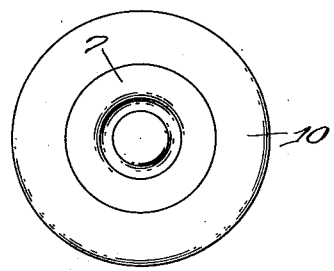
Inventor:
Herman R. C. Anthony
By Chritton, Wiles, Davis & Hirsch
Attys.

Patented Apr. 18, 1944

2,346,640

UNITED STATES PATENT OFFICE 2,346,640

METHOD OF MAKING LEAKPROOF DRY CELLS

Herman R. C. Anthony, Madison, Wis., assignor to Ray-O-Vac Company, a corporation of Wisconsin Application July 11, 1942, Serial No. 450,510

3 Claims. (Cl. 18—59)

This invention relates to the manufacture of leak-proof dry-cells and more particularly to an improved method of making such cells leak-proof by extruding an insulating jacket of thermoplastic material around the sides and top of the cell.

In my Patent No. 2,198,423, issued April 23, 1940, is shown a leak-proof cell having a steel jacket insulated from both terminals. The primary object of the present invention is to produce a satisfactory cell for similar use which does not require a metal outer jacket and as the plastic material itself is electrically non-conductive, it is unnecessary to provide a special sheet of insulating material between the jacket and the zinc electrode.

The invention is illustrated in a preferred embodiment in the accompanying drawing, in which—

Figure 1 is a fragmentary elevational view of a leak-proof dry-cell manufactured in accordance with the present invention; Figure 2, a vertical sectional view of the extrusion apparatus while forming an insulating jacket around a cell; and Figure 3, a bottom plan view of the cell shown in Figure 1.

In the embodiment illustrated, the mold is shown with metal cylindrical side walls 4 in which fits a bottom member 5 provided on its upper face with projections 6 to centralize the bottom terminal plate 7 of the dry cell during the molding operation. The top of the mold is closed by a downwardly movable form plate 8 which is hollow to receive an extrusion plunger 9 and a charge of thermoplastic molding material 10. The downward movement of the form plate may be limited by shoulders 11 and carries in its bottom face a socket member 12 of insulating material which is hollowed out to receive the exposed metal cap 13 on the carbon electrode of the cell. The socket member is made of insulating material so that the dry cell will not be short circuited during the molding operation.

The dry cell has a cup shaped electrode 14 which is made of zinc and contains the usual carbon electrode 15 surrounded by a bobbin of depolarizing mix 16 resting in the electrolytic paste 17. A disk of insulating material 18 is secured to the top of the zinc can and provides an air space 19 within the cell. Preferably, the metal cap 13 for the carbon electrode has an outwardly extending corrugated flange 20, and, if desired, may be provided with a small vent hole 21 to permit gas to escape from within the cell through the carbon pole 15 which is specially treated to prevent electrolyte from escaping.

The bottom terminal member 7 is also shown with an up-turned corrugated flange 22 which, after the molding operation, is embedded in the insulating jacket of the cell.

The plastic jacket is formed on the cell in the following manner. The metal terminal plate 7 is placed on the center of the bottom member 5 of the mold and the dry cell is placed thereon in the center of the mold. The form plate 8 is then moved downwardly as far as permitted by the shoulders 11 and a measured amount of thermoplastic material 10 is placed in the chamber beneath the plunger 9. The plunger is then forced downwardly and the heated plastic material is extruded downwardly through the plate over the top of the cell and down around the side walls to the bottom, so as to enclose the marginal edge portions 22 of the terminal plate and also the marginal edge portions 20 of the cap 13. The mold is then opened up and the cell removed. The sprue may be trimmed off readily and a suitable label attached to the jacket.

Various thermoplastic materials may be used but one with an asphalt base is preferred because of its low cost.

It will be understood that a series of molds, like the one illustrated, can be mounted on a turret and the dry-cells introduced from either above or below prior to the molding operation.

The cell formed by this method is of attractive appearance and of sufficient strength to withstand considerable pressure that may be developed internally as the cell is discharged rapidly.

The foregoing detailed description has been given for clearness of understanding only, and no unnecessary limitations should be understood therefrom for some modifications will be obvious to those skilled in the art.

I claim:

1. The method of forming a leak-proof dry-cell, which comprises: placing a metal terminal member on the center of the bottom plate of a mold; placing a dry-cell in the center of the mold so as to rest on said terminal member in electrical contact therewith; closing the mold, without short circuiting the cell, with a top from which is recessed and lined with electrical insulating material to receive the outer end of the central electrode of the cell; and extruding thermoplastic molding material around the sides and top of said cell to form a hermetically sealed jacket and about both faces of the marginal edge portions at the metal terminal member for the cell.

2. The method of forming a leak-proof dry-cell, which comprises: placing a dry-cell in a mold with its central carbon electrode projecting into an electrically insulated recess in the top form of the mold and its bottom resting on a centrally disposed metal terminal member in the bottom of the mold; and extruding thermoplastic molding material around the sides and top of said cell so as to enclose the marginal edge portions of the bottom terminal member and form an insulating jacket for the sides and top of the cell.

3. The method of forming a leak-proof dry-cell, which comprises: placing a metal terminal member on the center of the bottom plate of a mold; placing a dry-cell in the center of the mold so as to rest on said terminal member in electrical contact therewith, said dry-cell having a metal cap on the exposed end of the carbon electrode; closing the mold, without short circuiting the cell, with a top form which is recessed and lined with insulating material to receive the metal cap; and extruding thermoplastic molding material around the sides and top of the cell and sealing the marginal edge portions of the bottom plate and metal cap in said material.

HERMAN R. C. ANTHONY.

CERTIFICATE OF CORRECTION.

Patent No. 2,346,640.  April 18, 1944.

HERMAN R. C. ANTHONY.

It is hereby certified that error appears in the printed specification of the above numbered patent requiring correction as follows: Page 1, second column, line 46, claim 1, for "from" read --form--; and that the said Letters Patent should be read with this correction therein that the same may conform to the record of the case in the Patent Office.

Signed and sealed this 6th day of June, A. D. 1944.

Leslie Frazer (Seal) Acting Commissioner of Patents.